United States Patent [19]
Nakamura et al.

[11] Patent Number: 5,461,511
[45] Date of Patent: Oct. 24, 1995

[54] BASE BODY OF A REFLECTING MIRROR AND METHOD FOR THE PREPARATION THEREOF

[75] Inventors: Tatsumasa Nakamura, Saitama; Yoshiaki Ise, Fukui; Yoshiaki Okamoto, Kanagawa, all of Japan

[73] Assignees: Shin-Etsu Quartz Co., Ltd., Tokyo; Okamoto Optics Work, Inc., Kanagawa, both of Japan

[21] Appl. No.: 197,702

[22] Filed: Feb. 17, 1994

Related U.S. Application Data

[62] Division of Ser. No. 785,103, Oct. 30, 1991, Pat. No. 5,316,564.

[30] Foreign Application Priority Data

Apr. 23, 1991 [JP] Japan ................................. 3-119258
May 10, 1991 [JP] Japan ................................. 3-135536

[51] Int. Cl.⁶ .............................................. G02B 5/08
[52] U.S. Cl. ........................... 359/514; 359/846; 359/848; 65/36; 65/54
[58] Field of Search ........................ 359/838, 845, 359/846, 848, 871, 883, 513, 514; 65/36, 54, 55

[56] References Cited

U.S. PATENT DOCUMENTS

| | | | |
|---|---|---|---|
| 4,035,065 | 7/1977 | Fletcher et al. | 359/848 |
| 4,256,378 | 3/1982 | Prewo et al. | 359/848 |
| 4,331,383 | 5/1982 | Christiansen | 359/848 |
| 4,364,763 | 12/1982 | Rennerfelt | 65/22 |
| 4,422,893 | 12/1983 | Duchateau et al. | 156/232 |
| 4,657,359 | 4/1987 | Thompson et al. | 359/845 |
| 4,670,338 | 6/1987 | Clemino | 428/312.6 |
| 4,875,766 | 10/1989 | Shimodaira et al. | 359/883 |
| 5,002,378 | 3/1991 | Colarusso et al. | 359/883 |

*Primary Examiner*—Paul M. Dzierzynski
*Assistant Examiner*—John Juba, Jr.
*Attorney, Agent, or Firm*—Wenderoth, Lind & Ponack

[57] ABSTRACT

The invention provides a light-weight base body of a reflecting mirror such as a mirror in a reflecting astronomical telescope which is very stable not only thermally but also mechanically and is highly resistant against adverse environmental influences. The mirror base is composed of a porous foamed disc body of fused quartz glass or high-silica glass sandwiched by two plates of fused quartz glass or high-silica glass, of which one is made from transparent glass and serves to provide an optical surface having flatness or a specified curvature, and the side surface of the porous foamed disc body is protected against environmental influences by providing an air-tight sealing layer formed from a silicone rubber-based sealing agent or a thin sheet of fused quartz glass or high-silica glass.

1 Claim, 1 Drawing Sheet

U.S. Patent     Oct. 24, 1995     5,461,511
FIGURE
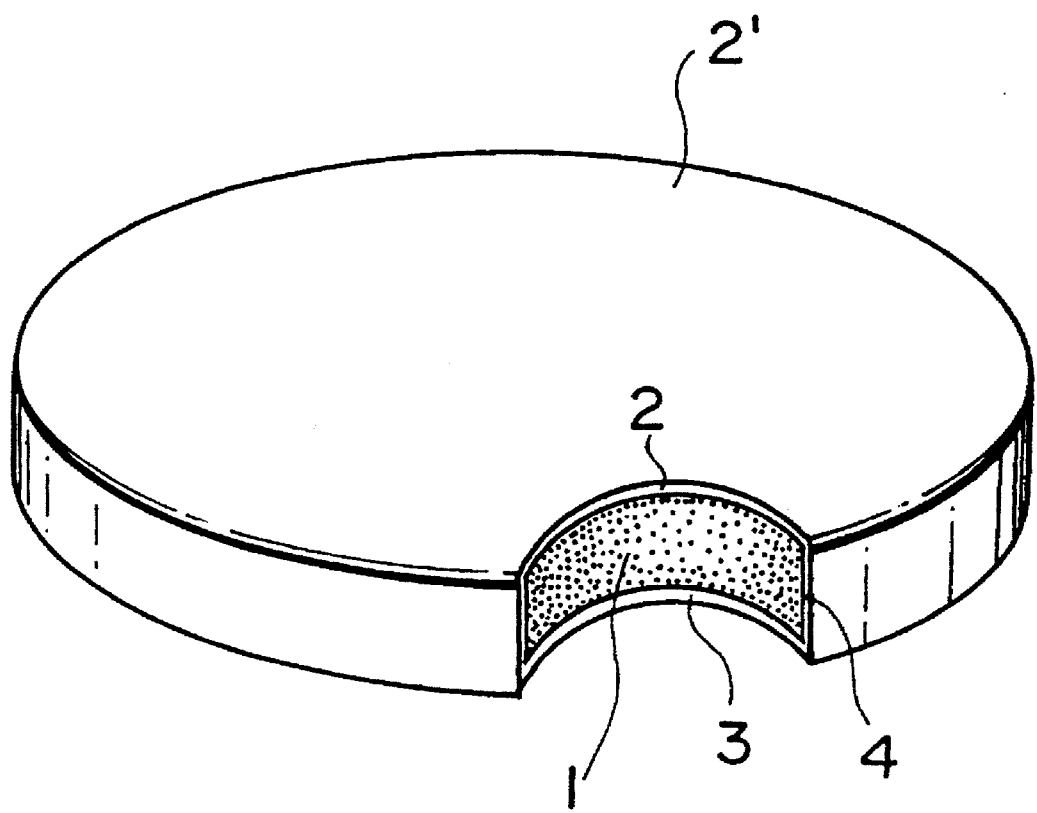

BASE BODY OF A REFLECTING MIRROR AND METHOD FOR THE PREPARATION THEREOF

This application is a division of now allowed Ser. No. 07/785,103 filed Oct. 30, 1991, now U.S. Pat. No. 5,316,564.

BACKGROUND OF THE INVENTION

The present invention relates to a base body of a reflecting mirror and a method for the preparation thereof. More particularly, the invention relates to a base body of a reflecting mirror such as those in astronomical telescopes, for beam collimation or diffusion in the space industry and so on, which is characterized by outstandingly light weight so as to ensure good operability and still has high mechanical strengths as a structural body and optical characteristics, as well as a method for the preparation thereof.

In the prior art, high-precision reflecting mirrors used in astronomical telescopes or for optical collimation of high-energy light beams are fabricated by providing a mirror base made from bubble-free fused quartz glass or high-silica glass having an extremely small thermal expansion coefficient with a high-reflectivity vapor-deposited film of a metal such as aluminum on one of the surfaces with flatness or a specified spherical curvature. These reflecting mirrors are used by being supported on a supporting stand to ensure free rotation and movement as desired. It is essential in these reflecting mirrors, especially when the size thereof is large, that the dimensional accuracy or precision of the reflecting surface is not influenced by the changes in the temperature or condition of the mechanical forces acting thereon as caused by the change in the disposition of the mirror.

The above mentioned requirements for high-precision reflecting mirrors can be satisfied relatively easily when the mirror is small having a diameter of, for example, 20 cm or smaller. In recent years, however, demand for high-precision reflecting mirrors is rapidly expanding for those having a larger and larger diameter of, for example, 1 meter or even larger. Such a large-sized reflecting mirror naturally has a very large weight which is responsible for the deformation of the mirror body caused by the influence of the disposition such as the mounting angle, resulting in warping or undulation of the mirror surface to greatly decrease the optical performance of the reflecting mirror.

Besides the above mentioned mechanical deformation due to the weight of the mirror body per se, large-sized reflecting mirrors also have a problem of dimensional expansion and shrinkage caused by the change in the ambient temperature or as a result of the radiation of high-energy light beams so that the mirror surface is subject to warping or undulation, resulting in a decrease in the optical performance of the reflecting mirror. This is the reason for the use of fused quartz glass or high-silica glass having an outstandingly small thermal expansion coefficient as the material of reflecting mirrors.

These glassy materials, however, have a relatively large specific gravity so that the mirror base shaped from glass is so heavy that the operability of the reflecting mirror is unavoidably poor if not to mention the increased mechanical deformation due to the large body weight of the mirror. Accordingly, various attempts and proposals have been made for decreasing the body weight of a reflecting mirror by the improvement in the supporting structure of the surface plate of the mirror without sacrifice in the supporting strength to comply with the practical requirement to ensure good operability of a large-sized reflecting mirror having a glass-made mirror base by decreasing the weight of the mirror base.

For example, Japanese Patent Publication 63-57761 discloses a light-weight glass-made mirror base of a reflecting mirror for astronomical telescopes, which consists of a front plate, i.e. the surface plate for providing the reflecting surface by metal plating, a rear plate or backing plate as a base for supporting the front plate and a latticework composed of a plural number of rows of pipes made from fused quartz glass sandwiched by the two plates. In the latticework of pipes, each pipe of the pipe rows is contacted in a cross-stitch arrangement with the two pipes in the respective adjacent two rows forming contacting lines or contacting zones while the wall thickness of the pipes is smaller along the above mentioned contacting lines or zones than in the other portions of the pipe walls, and the pipes are joined together into an integral latticework by welding along the contacting lines or zones. Such a complicated latticework structure of the intermediate layer between the front plate and the rear plate, however, is industrially very disadvantageous because of the very large costs for the preparation thereof. In addition, the mirror base having such a latticework structure has poor mechanical strength in the direction within the surface plane not to withstand the high-precision lapping and polishing works of the optical surface before metal plating to have a specified flatness or curvature of the surface.

Moreover, it is a very difficult matter to obtain the pipe elements forming the latticework having an exactly equal effective height so that the front plate supported by the latticework unavoidably retains a strain corresponding to the height difference in the pipe elements forming the latticework to cause deformation or undulation of the reflecting surface after lapse of some length of time. The rigidity of such a latticework is of course inherently anisotropic and differs between the directions which may be perpendicular to or parallel with the reflecting surface so that the reflecting mirror having such a base body can hardly be used when the mirror must take various dispositions by being rotated or moved on the supporting stand due to the poor accuracy of the reflecting surface when the disposition of the mirror is varied.

Further, Japanese Patent Publication 61-26041 discloses another light-weight glass-made base body of a reflecting mirror for astronomical telescopes. The base body of fused quartz glass also consists of a front plate, a rear plate and an interposed latticework therebetween integrated into a body by welding. The latticework is prepared by putting plate-formed and/or tubular lattice elements on a supporting plate to form a lattice and filling the spaces formed between the lattice elements with tiny pieces of the same glass susceptible to sintering followed by heating to effect sintering this assemblage as fastened with a graphite ring in a furnace under a non-oxidizing atmosphere. The thus prepared latticework is sandwiched between the front plate and the rear plate and welded together into an integral base body to be finished by polishing the surface of the front plate. Such a base body of a reflecting mirror is industrially disadvantageous and not practical due to the very lengthy and troublesome procedure of manufacture with very high costs, in addition to the problem that the front plate bonded to the latticework by welding retains substantial strains at the welded portions to greatly affect the dimensional accuracy of the reflecting surface.

SUMMARY OF THE INVENTION

The present invention accordingly has an object to provide a novel light-weight base body of a reflecting mirror and a method for the preparation of such a light-weight base body of a reflecting mirror having excellent dimensional stability against the influences of temperature changes and gravitational weight of the body per se, to avoid occurrence of deformation of the reflecting surface even when the size of the mirror is quite large. Another object of the invention is to provide a method for the preparation of a light-weight base body of a reflecting mirror having high three-dimensional mechanical strengths not only in the direction perpendicular to the reflecting surface but also in the direction parallel with the reflecting surface. A further object of the invention is to provide a method for the preparation of a light-weight base body of a reflecting mirror which is protected on the outer surface with an air-tight sealing layer to avoid contamination in the processing procedure of polishing of the surface and subsequent handling.

Thus, the base body of a reflecting mirror provided by the invention is an integral body which comprises:

(A) a front plate of transparent fused quartz glass or high-silica glass having an optically flat or curved surface;

(B) a porous foamed body of fused quartz glass or high-silica glass bonded to the surface of the front plate opposite to the optically flat or curved surface;

(C) a rear plate of fused quartz glass or high-silica glass bonded to the surface of the porous foamed body opposite to the front plate; and (D) an air-tight sealing layer on the side surface of the porous foamed body.

The method of the invention for the preparation of a light-weight base body of a reflecting mirror comprises the steps off (a) bonding by fusion a porous foamed disc body of fused quartz glass or high-silica glass having a bulk density in the range from 0.1 to 1 g/cm$^3$ on one surface with a front plate of transparent fused quartz glass or high-silica glass having an optically flat or curved surface at the surface opposite to the optically flat or curved surface;

(b) bonding by fusion a plate of fused quartz glass or high-silica glass to the surface of the porous foamed disc body opposite to the surface to which the front plate is bonded; and (c) bonding an air-tight sealing layer to the side surface of the porous foamed disc body.

It is preferable that the air-tight sealing layer bonded to the side surface of the porous foamed disc body is formed from a silicone rubber-based sealing agent or, more preferably, from fused quartz glass or high-silica glass which is bonded by fusion to the side surface of the disc.

BRIEF DESCRIPTION OF THE DRAWING

The figure is a perspective view of the inventive base body of a reflecting mirror as partially cut open.

DETAILED DESCRIPTION OF THE PREFERRED EMBODIMENTS

In step (a) of the above defined inventive method, a front plate or surface plate, which has an optically flat or curved surface to be plated with a high-reflective metal to form a reflecting surface, is bonded by fusion to a porous foamed body as the base. This front plate is made from fused quartz glass or high-silica glass substantially free from bubbles to ensure very small thermal expansion or shrinkage not to be dimensionally influenced by the change in temperature. This front plate is shaped to have flatness or specified curvature depending on the intended use of the reflecting mirror.

The above described front plate is supported by a porous foamed disc body as the base. The material of the porous foamed disc body is fused quartz glass or high-silica glass of which the content of silicon dioxide is preferably at least 99% by weight. The porous foamed disc body should have a bulk density in the range from 0.1 to 1 g/cm$^3$. When the bulk density thereof is too low, the disc body would have poor mechanical strengths not to be suitable as a supporting base of the front plate with stability. When the bulk density thereof is too high, on the other hand, the body weight of the mirror base prepared by the inventive method cannot be small enough as a matter of course so that the reflecting mirror would be more or less subject to the problem of mechanical deformation by the gravity of the mirror body per se, in addition to the decreased operability of the reflecting mirror.

The porosity of the porous foamed body should desirably consists mainly of closed cells. When the closed cells form a well-developed three-dimensional network structure, the porous foamed body would be imparted with a high compressive strength in every direction against compressive forces.

The porous foamed disc body is bonded to the front plate over the whole area of the surface opposite to the optically flat or curved surface to serve as a uniform support so that high resistance is exhibited against the pressing force added to the surface of the front plate in the polishing work of the optical surface. In addition, the porous foamed disc body is highly resistant against mechanical forces in the direction parallel to the surface of the front plate.

The porous foamed disc body of fused quartz glass or high-silica glass can be prepared according to a procedure known in the art. For example, a powder of fused quartz glass consisting of silicon dioxide having hydroxyl groups is heated in an atmosphere of ammonia to be reacted therewith followed by shaping into a desired form and sintering. Alternatively, a powder of fused quartz glass is first shaped into a form and sintered and the sintered body is then ammoniated by heating in an atmosphere of ammonia. Thereafter, the ammoniated sintered body is heated in an electric furnace at a temperature of 1500° to 1800 ° C. to cause softening or melting of silicon dioxide which is expanded by the gas evolved from the glass to give a porous foamed body mainly consisting of closed cells. Further alternatively, foamed porous bodies of glass can be prepared by heating a blend of a glass powder and a blowing agent at a temperature sufficiently high to cause decomposition of the blowing agent to evolve a gas and to cause softening of the glass powder. At any rate, it is important in these processes that the conditions of foaming should be selected so as to obtain closed cells having an adequate diameter and to prevent formation of open cells by excessively increasing the temperature.

The porous foamed body of glass obtained in the above described manner is cut into a desired form such as a disc or square or rectangular board depending on the size and form of the reflecting mirror to be prepared therefrom. The thus shaped body of porous foamed glass is bonded, on one surface, to a front plate of transparent fused quartz glass or high-silica glass to provide the optical surface and, on the other surface, to a rear plate of also fused quartz glass or high-silica glass of which, however, the quality or purity need not be so high as in the front plate. The front plate and the rear plate can be bonded by fusion to the porous foamed disc body either separately or simultaneously. The procedure for bonding of the porous foamed disc body to the front plate or rear plate is as follows. Thus, the porous foamed disc body and the glass plate are laid one on the other by sandwiching an interposed layer of a finely divided silica powder in a thickness of, for example, about 1 mm over the whole area and they are heated together for about 1 to about 4 hours at a temperature higher than the softening point of the silica powder which, of course, should be higher than the softening point of the porous foamed body and the glass plate. When the softening point of the silica powder is the same as or higher than that of the porous foamed body or glass plate to be bonded together, softening of these members takes place to cause deformation or collapsing of the closed cells before the silica powder is softened to exhibit the adhesive bonding effect. Examples of suitable silica powders include those prepared by the so-called sol-gel method or by the pyrolytic gas-phase method in respect of the relatively low melting point. The silica powder should have a particle size as fine as possible in respect of the increased uniformity in the fusion-bonding layer formed therefrom. Practically, it is preferable to use a silica powder having an average particle diameter not exceeding 10 µm.

By this bonding method, the porous foamed disc body and the front plate or rear plate can be adhesively bonded over the whole contacting area with very high stability of bonding. In this regard, it is important that the surface of the porous foamed disc body is shaped to have a flatness or curvature just to fit the surface of the front plate to be bonded thereto opposite to the optical surface so that contacting can be obtained therebetween substantially over the whole area of surfaces.

The front plate bonded to one surface of the porous foamed disc body should be made from transparent fused quartz glass or high-silica glass of as high as possible purity substantially free from bubbles. This is because even extremely fine bubbles may be responsible for distortion or dimensional inaccuracy of the optical surface not to give a high-precision reflecting mirror. On the contrary, the rear plate bonded to the other surface of the porous foamed disc body need not be of so high purity and transparency as in the front plate and a small number of bubbles or a somewhat decreased transparency is permissible provided that it is made from fused quartz glass or high-silica glass.

The porous foamed disc body to which the front plate and the rear plate are bonded at one and the other surfaces is then provided with an air-tight sealing layer on the side surface thereof. Formation of this air-tight sealing layer is preferably preceded by a smoothening finishing treatment of all over the side surface of, in particular, the porous foamed disc body in order to have the airtight sealing layer properly formed. This smoothening treatment of the surface can be performed either by grinding with an abrasive grinder or by blowing a flame such as an oxyhydrogen flame to the surface.

The thus smoothened side surface of the porous foamed disc body is then provided with an air-tight sealing layer. The sealing layer can be formed by coating the smoothened surface with various kinds of sealing agents. An example of suitable sealing agent is a silicone rubber-based sealing agent which is applied to the surface and cured at room temperature or by heating. It is not always necessary that the air-tightness of the sealing layer is very high. However, it has been discovered unexpectedly that the air-tight sealing layer on the side surface plays a very important role in order to obtain quite satisfactory results in the precision polishing of the optical surface of the front plate of the base body prepared by the inventive method. The reason therefor is not clear but it is presumable that, in the polishing work using an aqueous dispersion of an abrasive powder, water and the abrasive particles may enter the pore structure of the porous foamed disc body and the interstices between the porous disc body and the front and rear plates, though in very small amounts, to delicately influence the accuracy of the polishing work on the optical surface to which a highly reflective layer of a metal such as aluminum and silver is deposited to give a reflecting surface. The base body of a reflecting mirror prepared in the above described manner is then subjected to high-precision polishing of the optical surface to be imparted with flatness or a specified curvature depending on the intended use of the reflecting mirror before the optical surface is provided with a reflecting layer of a metal. The polishing work of the surface can be performed according to a conventional procedure, for example, by using an aqueous dispersion of an abrasive fine powder.

The base body of a reflecting mirror prepared by the inventive method is illustrated in the figure of the accompanying drawing which is a perspective view thereof as partially cut open. The base body is constituted of a porous foamed disc body 1 of fused quartz glass or high-silica glass sandwiched between a front plate 2 having an optically finished surface 2' and a rear plate 3 each also of fused quartz glass or high-silica glass while the side surface of the porous foamed disc body 1 is covered with an air-tight sealing layer 4.

Instead of forming the air-tight sealing layer by using a silicone rubber-based sealing agent, still better results could be obtained when the sealing layer was formed from fused quartz glass or high-silica glass to thus envelop the porous foamed disc body entirely with a glassy layer. Such a sealing layer of glass can be formed by first depositing a layer of a fine glass powder onto the surface to be protected followed by fusion of the powder layer, but it is more practical that a thin sheet of glass is applied to the side surface of the porous foamed disc body and then softened by heating and bent successively from the starting end to be fusion-bonded to the side surface of the porous disc body. As compared with the sealing layer of a silicone rubber-based sealing agent, the sealing layer of glass thus formed is very advantageous because not only the side surface of the porous body can be protected almost perfectly against contamination in the polishing work by using an aqueous dispersion of an abrasive powder, but also the base body of a reflecting mirror can be greatly reinforced in respect of the mechanical strengths.

A problem in the base body having the above mentioned glassy sealing layer on the side surface is that, when the base body after finishing of the optical surface by polishing is subjected to the process of deposition of the reflecting layer of a metal at an elevated temperature, the base body is sometimes heated to a considerably high temperature so that expansion of the air confined in the base body may have an adverse influence on the dimensional accuracy of the body eventually leading to bursting of the sealing layer. This problem can be readily solved by forming one or several small vent holes in the air-tight sealing layer of glass on the side surface.

In the following, the base body and the method of the present invention are described in more detail by way of examples.

EXAMPLE 1

Silicon tetrachloride was introduced into a burner of oxyhydrogen flame and subjected to flame hydrolysis to form silica soot which was reacted with ammonia gas at 1000° C. for 2 hours. The thus ammoniated silica soot was shaped into a form and heated at 1600° C. for 10 minutes so that the shaped body was expanded by the ammonia gas isolated from the ammoniated silica soot to give a porous foamed body of fused quartz glass having a bulk density of about 0.3 g/cm$^3$. This porous foamed body was fabricated by cutting into a disc having a diameter of 350 mm and a thickness of 25 mm.

A finely divided silica powder was spread on the surface of the thus prepared porous foamed disc body to form a thin powder layer of uniform thickness. Then a transparent fused quartz glass sheet free from any bubbles having a diameter of 350 mm and a thickness of 0.5 mm as a front plate was laid on the layer of the finely divided silica powder and heated at a temperature of about 1300 ° C. for 30 minutes so that the silica powder was melted and the glass sheet was fusion-bonded to the porous foamed disc body. In this heating treatment, the porous foamed disc body was mounted on a plate of fused quartz glass having a diameter of 350 mm and a thickness of 0.5 mm as a rear plate with an interposed layer of a finely divided silica powder therebetween over the whole surface so that this rear plate was also bonded simultaneously to the porous foamed disc body.

The side surface of the porous foamed disc body sandwiched between the front and rear plates was ground smoothly using a grinder and then uniformly coated with a room temperature-curable, silicone rubber-based sealing agent which was cured by standing at room temperature to form an air-tight sealing layer having a thickness of 0.5 to 5 mm thereon.

The optical surface of the front plate of the thus prepared base body of a reflecting mirror could be lapped and polished using an aqueous dispersion of an abrasive powder without the disadvantage of occurrence of strain to cause a decrease in the performance of light reflection because the front plate was very firmly and uniformly bonded to the supporting base of the porous foamed disc body over the whole surface and was free from deformation or breakage of the front plate by the pressing force added thereto in the polishing work. The flatness of the thus polished optical surface was examined by the method of optical interference fringes to find that the interference fringes were all parallel to each other, indicating that the optical surface had extremely high flatness.

EXAMPLE 2

The procedure for the preparation of a porous foamed disc body sandwiched by a front plate and a rear plate was substantially the same as in Example 1 except that the front plate of fused quartz glass had a diameter of 350 mm and a thickness of 3 mm and the rear plate of fused quartz glass also had a diameter of 350 mm and a thickness of 3 mm. A sheet of fused quartz glass having a thickness of 1 mm, width of 30 mm and length of 1100 mm was applied to the side surface of the porous foamed disc body and bent and fusion-bonded to the side surface successively from the starting end by using an oxyhydrogen flame to form an integrated air-tight sealing layer.

Flatness of the optical surface was as good as in Example 1 as examined by the method of optical interference fringes to give parallel interference fringes after polishing of the surface of the front plate using an aqueous dispersion of an abrasive powder.

A high-precision flat reflecting mirror was obtained by depositing a thin aluminum layer on the polished surface of the front plate. This reflecting mirror was much lighter in weight than conventional reflecting mirrors of the same size, of which the mirror base is formed from a block of fused quartz glass, to ensure good operability without sacrifice in the optical characteristics.

What is claimed is:

1. A light-weight base body of a reflecting mirror which is an integral body comprising:

(A) a front plate of transparent fused quartz glass or high-silica glass having an optically flat or curved surface;

(B) a porous foamed body of fused quartz glass produced by heating a powder of fused quartz glass consisting of silicon dioxide having hydroxyl groups in an atmosphere of ammonia, said porous foamed body having mainly closed cells and having a bulk density in the range from 0.1 to 1 g/cm$^3$ and having a front face bonded to the surface of the front plate opposite to the optically flat or curved surface;

(C) a rear plate of fused quartz glass or high-silica glass bonded to the rear face opposite to the front face of the porous foamed body; and (D) an air-tight sealing layer, formed from a silicone rubber-based sealing agent, on the side surface of the porous foamed body.

* * * * *